(12) United States Patent
Nakanishi

(10) Patent No.: US 8,348,445 B2
(45) Date of Patent: Jan. 8, 2013

(54) BACKLIGHT UNIT, ELECTRO-OPTICAL DEVICE, AND ELECTRONIC APPARATUS

(75) Inventor: Daisuke Nakanishi, Matsumoto (JP)

(73) Assignee: Epson Imaging Devices Corporation, Azumino-shi, Nagano (JP)

( * ) Notice: Subject to any disclaimer, the term of this patent is extended or adjusted under 35 U.S.C. 154(b) by 277 days.

(21) Appl. No.: 12/420,169

(22) Filed: Apr. 8, 2009

(65) Prior Publication Data

US 2010/0027241 A1  Feb. 4, 2010

(30) Foreign Application Priority Data

Jul. 31, 2008  (JP) .................................. 2008-198373

(51) Int. Cl.
*G09F 13/04* (2006.01)
(52) U.S. Cl. ...................................... 362/97.3; 362/632
(58) Field of Classification Search ........ 362/97.1–97.4, 362/612, 632, 609
See application file for complete search history.

(56) References Cited

U.S. PATENT DOCUMENTS

| | | | | |
|---|---|---|---|---|
| 7,259,810 | B2* | 8/2007 | Kim .................................. | 349/67 |
| 2007/0121343 | A1* | 5/2007 | Brown ............................ | 362/612 |
| 2008/0173883 | A1* | 7/2008 | Hussell et al. .................. | 257/98 |
| 2008/0303040 | A1* | 12/2008 | Chou et al. ...................... | 257/89 |

FOREIGN PATENT DOCUMENTS

| | | |
|---|---|---|
| JP | 2006-244990 | 9/2006 |
| JP | 2007-080798 | 3/2007 |
| JP | 2007-128129 | 5/2007 |
| WO | 2007/037047 A1 | 4/2007 |

* cited by examiner

*Primary Examiner* — Julie Shallenberger
(74) *Attorney, Agent, or Firm* — Law, Hauptman, Ham & Berner, LLP

(57) ABSTRACT

A direct-type backlight unit includes: an arrangement surface on which a plurality of light sources are arranged; and a plurality of reflecting surfaces that are formed at a plurality of ends of the arrangement surface and reflect light emitted from the plurality of light source. Light emitted from the light sources and light reflected from the plurality of reflecting surfaces irradiate to a radiation area surrounded by the plurality of reflecting surfaces. The plurality of reflecting surfaces are inclined at an angle that is smaller than 90 degrees with respect to an extension surface of the arrangement surface that extends toward the outside of the reflecting surface. The plurality of reflecting surfaces include reflecting surfaces having a large inclination angle and reflecting surfaces having an inclination angle that is smaller than the large inclination angle. The light sources that are arranged along the reflecting surfaces having the large inclination angle are closer to the edge of the radiation area than the other light sources that are arranged along the reflecting surfaces having the small inclination angle, in a plan view of the radiation area.

20 Claims, 6 Drawing Sheets

SMALL INCLINATION ANGLE

LARGE INCLINATION ANGLE

LARGE INCLINATION ANGLE    SMALL INCLINATION ANGLE

BACKLIGHT UNIT, ELECTRO-OPTICAL DEVICE, AND ELECTRONIC APPARATUS

The entire disclosure of Japanese Patent Application No. 2008-198373, filed Jul. 31, 2008 is expressly incorporated by reference herein.

BACKGROUND

1. Technical Field

The present invention relates to a direct-type backlight unit including a plurality of light sources, and an electro-optical device and an electronic apparatus using the backlight unit.

2. Related Art

In the related art, in general, a liquid crystal display (LCD), which is an electro-optical device, includes a display panel that displays an image and a backlight unit that is provided on the rear side of the display panel and emits light to the display panel.

A direct-type backlight unit has been proposed which includes a plurality of light sources arranged immediately below the display panel (for example, JP-A-2006-244990 and JP-A-2007-128129).

The direct-type backlight unit disclosed in JP-A-2006-244990 and JP-A-2007-128129 includes a box-shaped case with a lower plate, a plurality of light sources that are provided in the case, and a display panel that is arranged so as to cover an opening of the case. The case includes a lower plate on which a plurality of light sources are arranged in a line and a plurality of side walls that are obliquely provided at the edge of the lower plate. The plurality of side walls are provided at the same inclination angle.

Light emitted from the plurality of light sources and light reflected from the inner surfaces (reflecting surfaces) of the plurality of side walls irradiate toward a radiation area surrounded by the upper ends of the plurality of side walls.

However, in JP-A-2006-244990 and JP-A-2007-128129, during the assembly of the backlight unit, when a plurality of light sources are arranged in a line, it is difficult to accurately arrange the light sources on the lower plate of the case such that the light sources are equidistant from the side walls. As a result, a variation in the arrangement positions of the light sources occurs.

Therefore, when the distance between the light source and the side wall is large, the amount of light reflected from the reflecting surface of the side wall is reduced. When the distance between the light source and the side wall is small, the amount of light reflected from the reflecting surface of the side wall is increased. As a result, the amount of light in the radiation area becomes non-uniform. In addition, when the distance between the side wall and the light source is large, the amount of light reflected from the reflecting surface of the side wall is reduced. As a result, the amount of light emitted to the edge of the radiation area is reduced, and optical characteristics deteriorate.

In a liquid crystal display device, which is an assembly of the backlight unit and the display panel, when the amount of light in the radiation area of the backlight unit becomes non-uniform, display irregularities, such as brightness irregularity and color irregularity, are likely to occur in an effective display area of the display panel in which an image is displayed.

SUMMARY

An advantage of some aspects of the invention is that it provides a backlight unit capable of making the amount of light in the entire radiation area uniform to improve optical characteristics, effectively using light emitted from a light source to reduce power consumption, and providing a bright illuminating device, and an electro-optical device and an electronic apparatus capable of preventing the occurrence of display irregularities in an effective display area.

According to an aspect of the invention, a direct-type backlight unit includes: an arrangement surface on which a plurality of light sources are arranged; and a plurality of reflecting surfaces that are formed at a plurality of ends of the arrangement surface and reflect light emitted from the plurality of light source. Light emitted from the light sources and light reflected from the plurality of reflecting surfaces irradiate toward a radiation area surrounded by the plurality of reflecting surfaces. The plurality of reflecting surfaces are inclined at an angle that is smaller than 90 degrees with respect to an extension surface of the arrangement surface that extends toward the outside of the reflecting surface. The plurality of reflecting surfaces include reflecting surfaces having a large inclination angle and reflecting surfaces having an inclination angle that is smaller than the large inclination angle. The light sources that are arranged along the reflecting surfaces having the large inclination angle are closer to the edge of the radiation area than the other light sources that are arranged along the reflecting surfaces having the small inclination angle, in a plan view of the radiation area.

According to the above-mentioned structure, the reflecting surfaces having the large inclination angle reflect light emitted from the light sources that are arranged close to the edge of the radiation area, and supplement a portion of the radiation area in which the amount of light is reduced. In addition, light emitted from the light source that is arranged away from the edge of the radiation area is reflected from the reflecting surface having the small inclination angle at a large reflection angle and irradiates toward the edge of the radiation area. Therefore, the amount of light emitted to the edge of the radiation area is not reduced, and the amount of light in the entire radiation area is uniform. As a result, it is possible to provide a bright backlight unit with low power consumption and improved optical characteristics.

According to another aspect of the invention, a direct-type backlight unit includes: an arrangement surface on which a plurality of light sources are arranged; and a plurality of reflecting surfaces that are formed at a plurality of ends of the arrangement surface and reflect light emitted from the plurality of light source. Light emitted from the light sources and light reflected from the plurality of reflecting surfaces irradiate toward a radiation area surrounded by the plurality of reflecting surfaces. The plurality of reflecting surfaces are inclined at an angle that is smaller than 90 degrees with respect to an extension surface of the arrangement surface that extends toward the outside of the reflecting surface. The plurality of reflecting surfaces include reflecting surfaces having a large inclination angle and reflecting surfaces having an inclination angle that is smaller than the large inclination angle. The reflecting surfaces on which a large amount of light is incident from the light sources have the large inclination angle, and the reflecting surfaces on which a small amount of light is incident from the light sources have the small inclination angle.

According to the above-mentioned structure, light reflected from the reflecting surface having the large inclination angle supplements a portion of the radiation area in which the amount of light is reduced, and light reflected from the reflecting surface having the small inclination angle is emitted to the edge of the radiation area. Therefore, the amount of light emitted to the edge of the radiation area is not reduced, and the amount of light in the entire radiation area is uniform. As a result, it is possible to provide a bright backlight unit with improved optical characteristics and low power consumption.

The backlight unit according to the above-mentioned aspect may further include a case that includes a lower plate and a plurality of side walls which are vertically provided at the edge of the lower plate. The arrangement surface having the plurality of light sources formed thereon may be mounted on an inner surface of the lower plate, and the plurality of reflecting surfaces that reflect light emitted from the plurality of light sources may be arranged on the inner surfaces of the plurality of side walls.

The backlight unit according to the above-mentioned aspect may further include a case that includes a lower plate and a plurality of side walls which are vertically provided at the edge of the lower plate. The lower plate may be the arrangement surface having the plurality of light sources formed thereon, and the plurality of reflecting surfaces that reflect light emitted from the plurality of light sources may be arranged on the inner surfaces of the plurality of side walls.

In the backlight unit according to the above-mentioned aspect, a space may be provided between the outside of the reflecting surface having the small inclination angle and the inside of the side wall.

According to the above-mentioned structure, there is a large space on the rear surface side of the reflecting surface having the small inclination angle, and it is possible to effectively use the space.

In the backlight unit according to the above-mentioned aspect, electronic parts may be provided in the space.

According to the above-mentioned structure, it is possible to reduce the size of a backlight unit.

In the backlight unit according to the above-mentioned aspect, the light sources may emit light such that the direction of the peak of the amount of light emitted is inclined at an angle of 50° to 80° with respect to the front direction of the light sources.

According to the above-mentioned structure, since the direction of the peak of the amount of light emitted from the light sources is inclined at an angle of 50° to 80° with respect to the front direction of the light sources, light is effectively reflected from a plurality of reflecting surfaces to the radiation area. Therefore, it is possible to provide a backlight unit with improved optical characteristics.

According to still another aspect of the invention, an electro-optical device includes: the backlight unit having the above-mentioned structure; and a display panel that is provided so as to overlap the radiation area of the backlight unit. The display panel includes an effective display area that displays an image, and the edge of the effective display area overlaps the plurality of reflecting surfaces of the backlight unit, in a plan view of the radiation area. In addition, the effective display area may be provided in the radiation area.

According to the above-mentioned structure, light that is uniformly emitted to the radiation area of the backlight unit is certainly emitted to the edge of the effective display area of the display panel. Therefore, it is possible to prevent the occurrence of display irregularities in the effective display area. As a result, it is possible to display an image with high quality and high brightness.

According to yet another aspect of the invention, an electronic apparatus includes the electro-optical device having the above-mentioned structure. According to this structure, it is possible to provide an electronic apparatus including a display unit with high image quality and high brightness.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention (hereinafter, referred to as embodiments) will be described in detail with reference to the accompanying drawings.

First Embodiment

Backlight Unit

Figure 1:
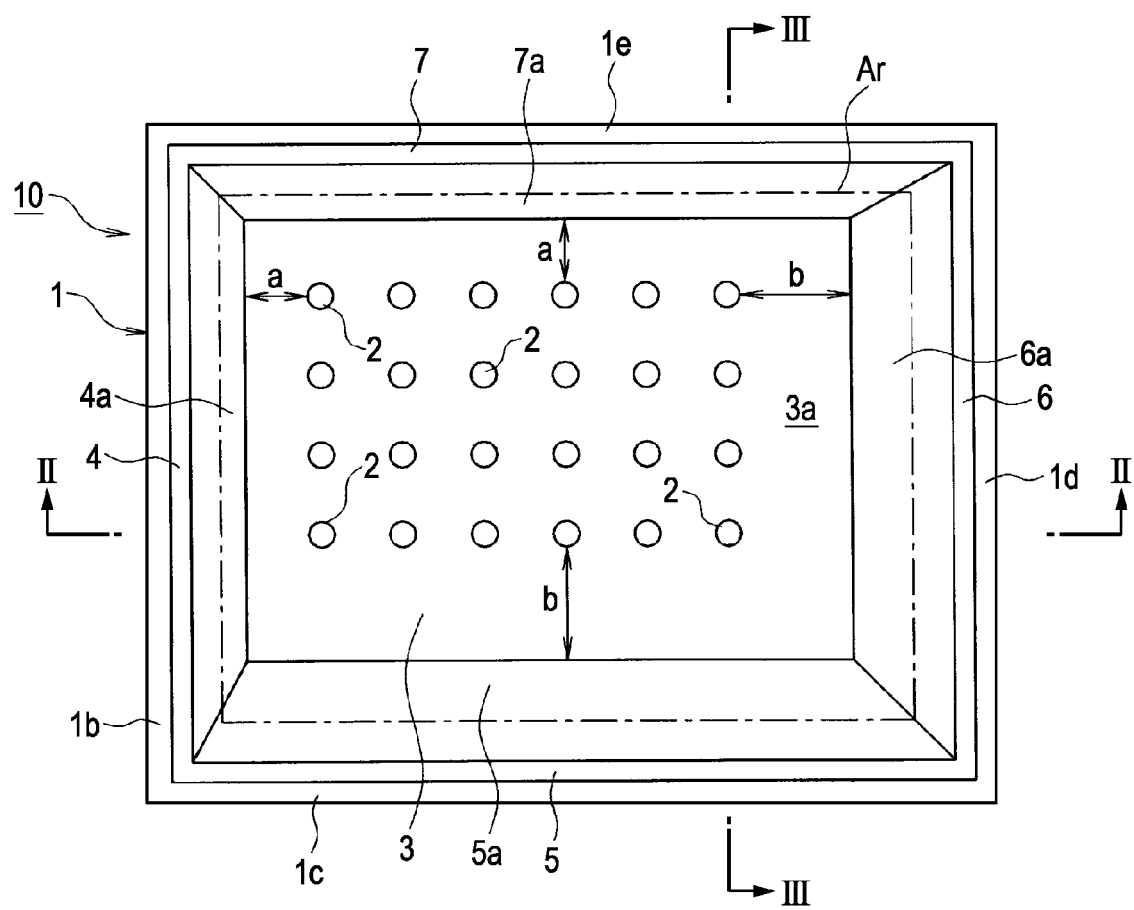
FIG. 1 is a plan view illustrating a backlight unit according to a first embodiment of the invention.
Figure 2:
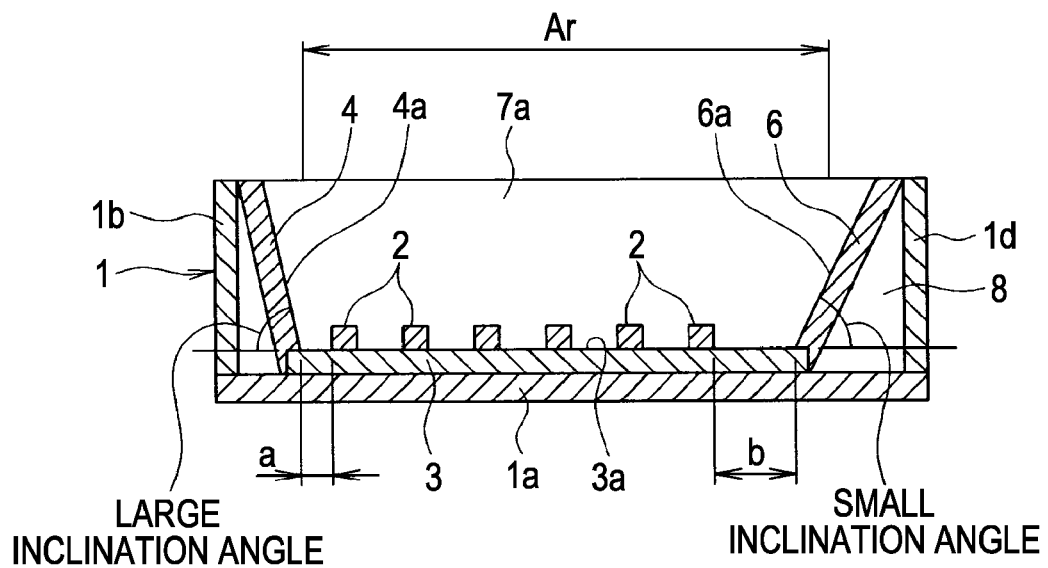
FIG. 2 is a cross-sectional view taken along the line II-II of FIG. 1.
Figure 3:
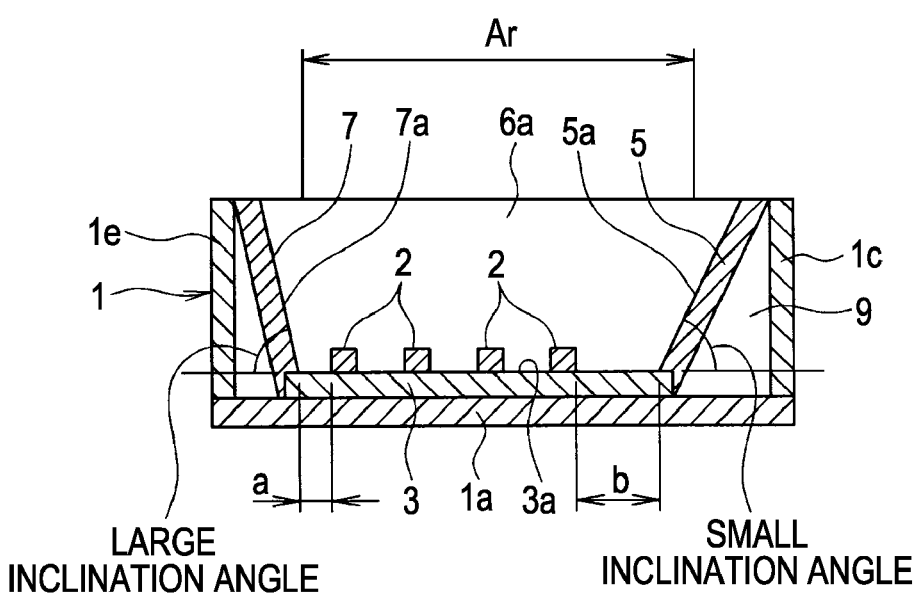
FIG. 3 is a cross-sectional view taken along the line III-III of FIG. 1.
Figure 4A:
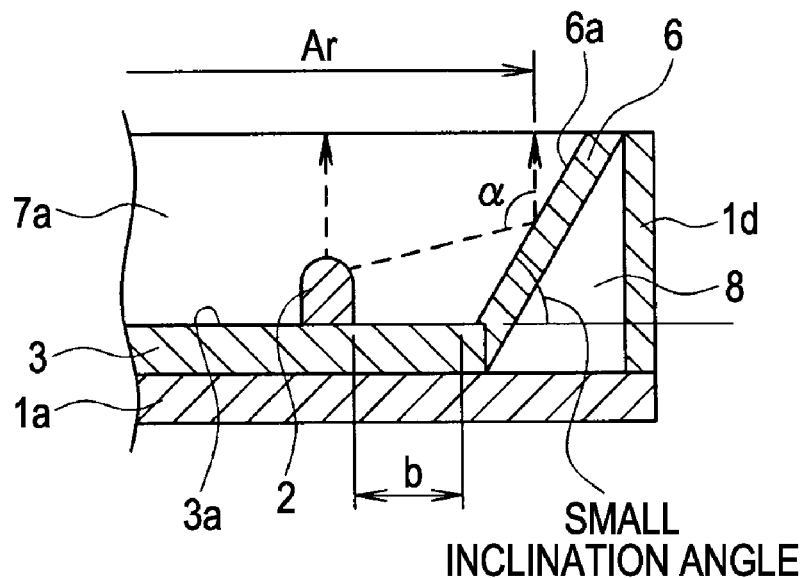
FIG. 4 is an enlarged view illustrating a main part of FIGS. 2 and 3.
Figure 4B:
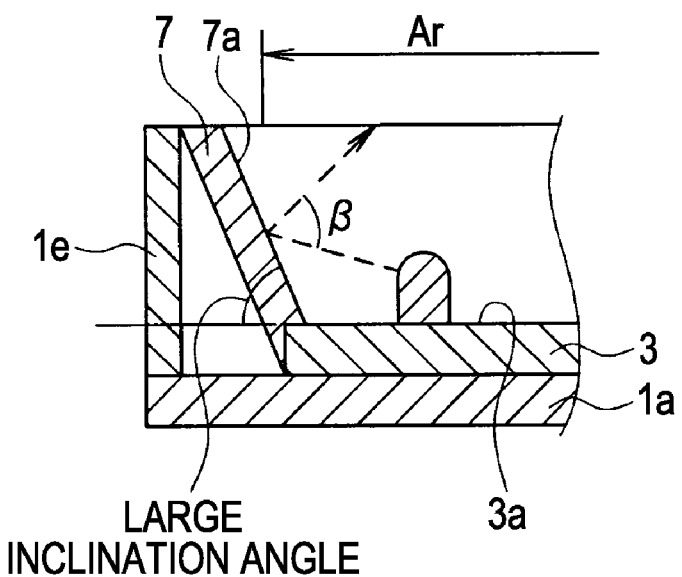

FIG. 1 is a plan view illustrating a backlight unit according to a first embodiment of the invention. FIG. 2 is a cross-sectional view taken along the line II-II of FIG. 1. FIG. 3 is a cross-sectional view taken along the line III-III of FIG. 2. FIG. 4A is an enlarged view illustrating a main part of FIG. 2, and FIG. 4B is an enlarged view illustrating a main part of FIG. 3.

A backlight unit 10 according to this embodiment includes a box-shaped case 1 with a lower plate and a plurality of light sources 2 that are arranged in a predetermined array in the case 1. The case 1 includes a lower plate 1a and a plurality of side walls 1b to 1e that are vertically provided at the edge of the lower plate 1a. An arrangement plate 3 is mounted on the lower plate 1a, and the plurality of light sources 2 are arranged on an arrangement surface 3a of the arrangement plate 3. In addition, inclined walls 4 to 7 are provided between the edge of the arrangement plate 3 and the upper ends of the side walls 1b to 1e.

Inner surfaces 4a to 7a of the inclined walls 4 to 7 are each formed as one plane that is inclined at an angle that is smaller than 90 degrees with respect to an extending surface that extends from the arrangement surface 3a to the outside, and serve as reflecting surfaces that reflect light emitted from the light sources 2 (hereinafter, referred to as reflecting surfaces 4a to 7a). Therefore, light emitted from the plurality of light sources 2 and light reflected from the reflecting surfaces 4a to 7a irradiate toward an opening surrounded by the reflecting surfaces 4a to 7a.

The inclination angles of the reflecting surfaces 5a and 6a are smaller than those of the other reflecting surfaces 4a and 7a (hereinafter, the reflecting surfaces 5a and 6a are referred to as reflecting surfaces having a small inclination angle, and the reflecting surfaces 4a and 7a are referred to as reflecting surfaces having a large inclination angle).

The plurality of light sources 2 provided on the arrangement surface 3a include light sources 2 that are arranged close to the reflecting surfaces 4a to 7a and light sources 2 that are arranged away from the reflecting surfaces 4a to 7a. The light sources 2 (the light sources 2 having a distance a from the reflecting surfaces 4a and 7a) that are arranged along the reflecting surfaces 4a and 7a having a large inclination angle are arranged closer to the reflecting surfaces than the light sources 2 (the light sources 2 having a distance b from the reflecting surfaces 5a and 6a) that are arranged along the reflecting surfaces 5a and 6a having a small inclination angle (a<b).

As shown in FIGS. 2 and 3, in the case 1, large spatial portions are provided on the rear surface side of the reflecting surfaces 5a and 6a having a small inclination angle, and spaces 8 and 9 capable of accommodating electronic parts, such as control units that control the light sources 2 of the backlight unit 10, are formed in the large spatial portions.

In addition, the plurality of light sources 2 are members each having a light-emitting element, such as an LED (light emitting diode) and an optical member, such as a concave lens, that is provided on a light emission side of the light-emitting element and is formed of, for example, a resin. The optical member can emit a large amount of light emitted from the light-emitting element in a direction that intersects the front direction of the optical member rather than in the front direction. The plurality of light sources 2 according to this embodiment emit light such that the direction of the peak of the amount of light emitted is inclined at an angle of 50° to 80° with respect to the front direction of the light sources.

When light is emitted from the plurality of light sources 2 of the backlight unit 10 according to this embodiment, the light emitted from the plurality of light sources 2 and light that is emitted from predetermined light sources 2 and then reflected from the reflecting surfaces 4a to 7a irradiate toward the opening surrounded by the outer ends of the reflecting surfaces 4a to 7a. That is, the light components are incident on a large radiation area Ar shown in FIG. 1.

The plurality of light sources 2 according to this embodiment include light sources 2 that are arranged at positions (distance b) away from the reflecting surfaces 5a and 6a and light sources 2 that are arranged at positions (distance a) close to the reflecting surfaces 4a and 7a. The inclination angles of the reflecting surfaces 5a and 6a which are away from the light sources 2 are smaller than those of the reflecting surfaces 4a and 7a. That is, the light sources 2 that are arranged along the reflecting surfaces 4a and 7a having a large inclination angle are closer to the edge of the radiation area Ar than the light sources 2 that are arranged along the reflecting surfaces 5a and 6a having a small inclination angle, in a plan view of the radiation area Ar.

Therefore, as shown in FIG. 4A, light emitted from the light sources 2 is reflected from the reflecting surface 6a having a small inclination angle at a large reflection angle α and then irradiates toward the edge of the radiation area Ar. Therefore, the amount of light emitted to the edge of the radiation area Ar is not reduced.

In addition, as shown in FIG. 4B, light emitted from the light source 2 that is arranged close to the reflecting surface 7a having a large inclination angle is reflected from the reflecting surface 7a at a small reflection angle β, and supplements a portion of the radiation area Ar in which the amount of light is reduced.

Therefore, even when the plurality of light sources 2 are arranged on the arrangement surface 3a at positions (distance b) away from the reflecting surfaces 4a to 7a and positions (distance a) close to the reflecting surfaces 4a to 7a, the amount of light emitted to the edge of the radiation area Ar is not reduced, and the amount of light is uniform in the entire radiation area Ar. Therefore, it is possible to provide the backlight unit 10 capable of improving optical characteristics.

Further, the light sources 2 according to this embodiment emit light such that the direction of the peak of the amount of light emitted is inclined at an angle of 50° to 80° with respect to the front direction of the light sources, and light emitted from the light sources 2 is effectively reflected from the reflecting surfaces 4a to 7a to the radiation area Ar and then irradiates toward the edge of the radiation area Ar. Therefore, the brightness of the edge of the radiation area Ar is improved. As a result, it is possible to provide the backlight unit 10 capable of improving optical characteristics.

Furthermore, in the backlight unit 10 according to this embodiment, electronic parts are accommodated in the spaces 8 and 9 that are formed on the rear surface sides of the reflecting surfaces 5a and 6a having a small inclination angle. Therefore, it is possible to effectively use the spaces 8 and 9.

In this embodiment, the reflecting surfaces 4a to 7a of the inclined walls 4 to 7 are each formed as one plane. However, each of the reflecting surfaces 4a to 7a may be formed as a curved surface having a predetermined curvature toward the end thereof (opening side).

In this embodiment, adjacent reflecting surfaces 5a and 6a have a small inclination angle, and adjacent reflecting surfaces 4a and 7a have a large inclination angle. However, the invention is not limited thereto. For example, the reflecting surfaces away from the light sources 2 arranged on the arrangement surface 3a may have a small inclination angle, and the reflecting surfaces close to the light sources may have a large inclination angle.

Second Embodiment

Backlight Unit

Figure 5:
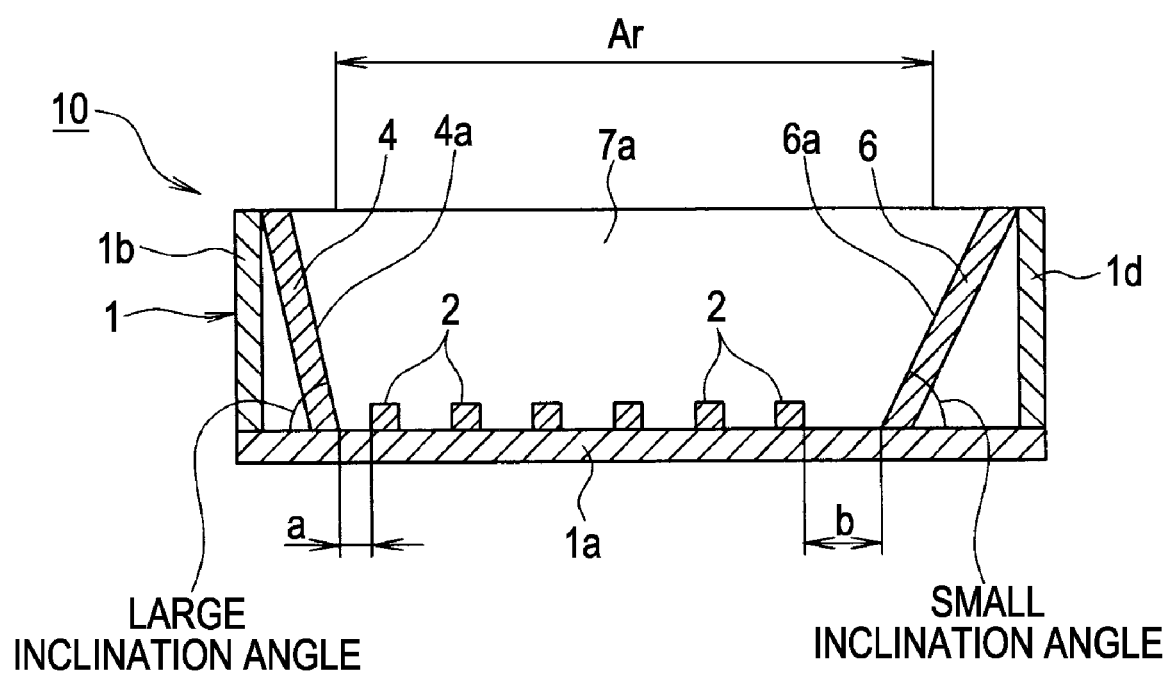
FIG. 5 is a plan view illustrating a backlight unit according to a second embodiment of the invention.

FIG. 5 is a cross-sectional view illustrating a backlight unit according to a second embodiment of the invention.

In a backlight unit 10 according to this embodiment, no arrangement plate 3 is mounted on the lower plate 1a of the case 1, and a plurality of light sources 2 are arranged on the lower plate 1a.

The reflecting surfaces 4a and 6a of the inclined walls 4 and 6 are each formed as one plane that is inclined at an angle that is smaller than 90 degrees with respect to the upper surface of the lower plate 1a. The inclination angle of the reflecting surface 6a is smaller than that of the other reflecting surface 4a.

Among the plurality of light sources 2 arranged on the upper surface of the lower plate 1a, the light sources 2 (the light sources 2 having a distance a from the reflecting surface 4a) that are arranged along the reflecting surface 4a having a large inclination angle are arranged closer to the reflecting surface than the light sources 2 (the light sources 2 having a distance b from the reflecting surface 6a) that are arranged along the reflecting surface 6a having a small inclination angle (a<b).

The upper surface of the lower plate 1a corresponds to an arrangement surface according to the invention.

According to this embodiment, it is possible to obtain the same effects as those in the first embodiment. In addition, since no arrangement plate 3 is mounted on the lower plate 1a of the case 1, it is possible to reduce the number of parts.

Third Embodiment

Liquid Crystal Display Device

Next, a liquid crystal display device, which is an example of an electro-optical device according to a third embodiment of the invention using the backlight unit 10 having the above-mentioned structure, will be described.

Figure 6:
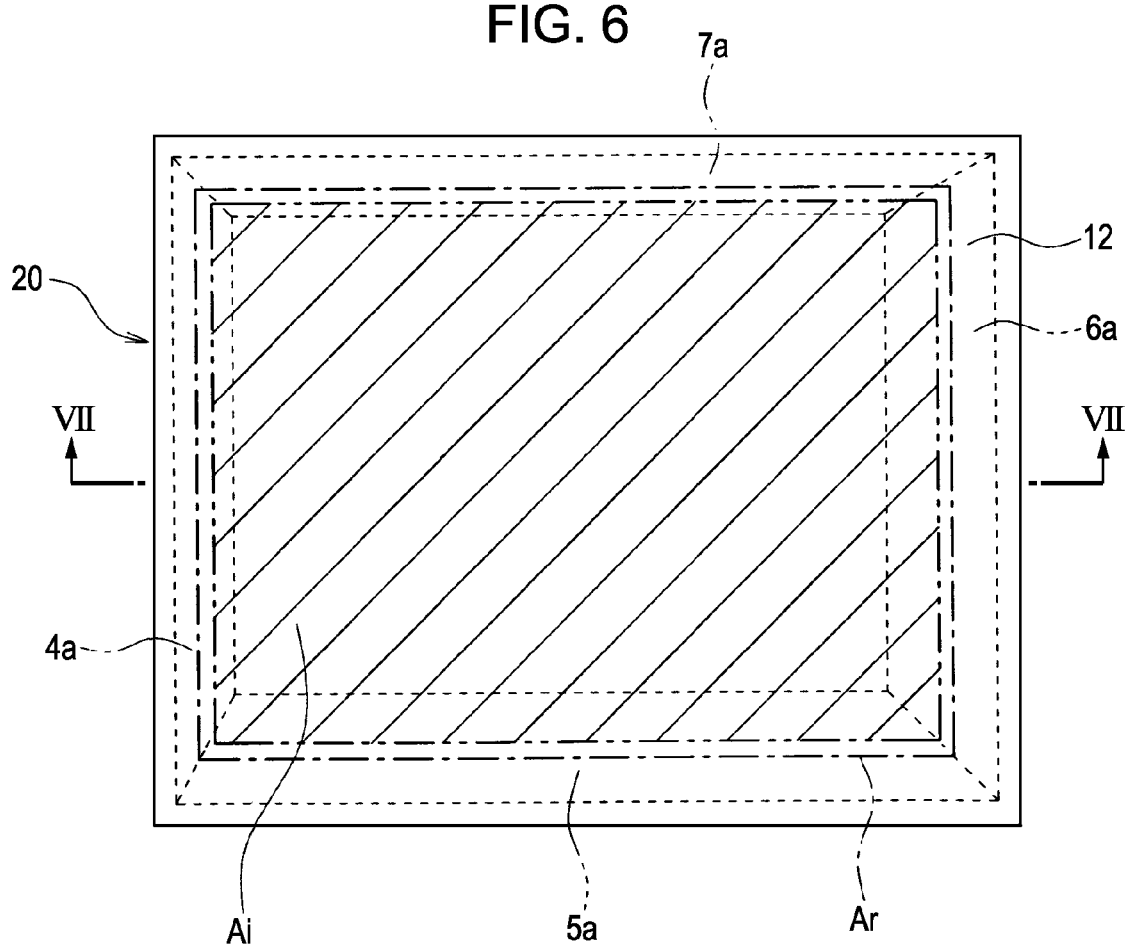
FIG. 6 is a plan view illustrating an electro-optical device according to a third embodiment of the invention.
Figure 7:
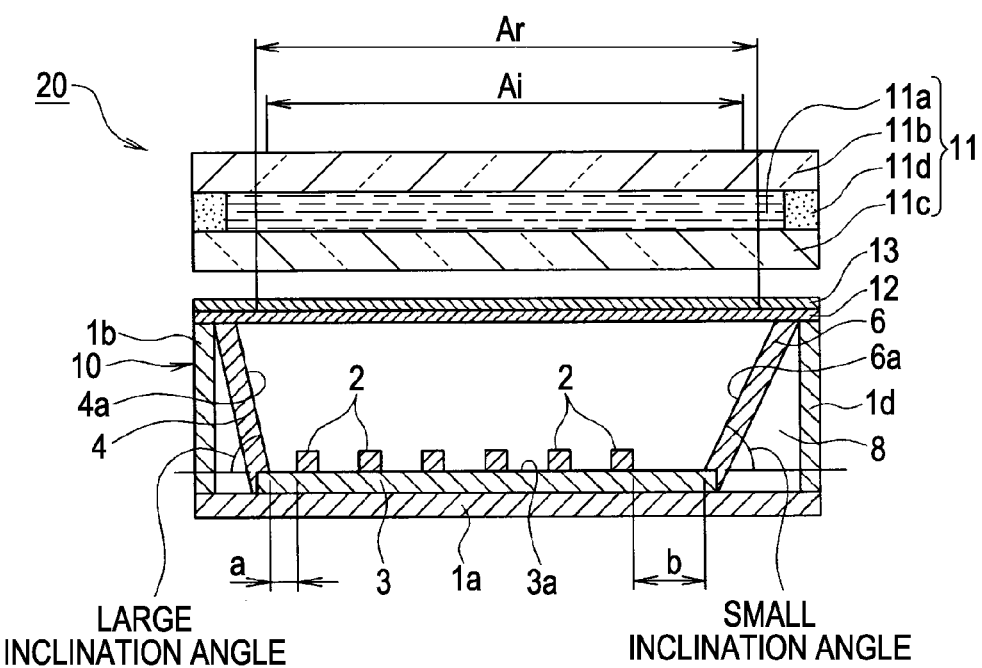
FIG. 7 is a cross-sectional view taken along the line VII-VII of FIG. 6.

FIG. 6 is a plan view illustrating the liquid crystal display device, and FIG. 7 is a cross-sectional view taken along the line VII-VII of FIG. 6.

A liquid crystal display device 20 according to this embodiment includes a liquid crystal display panel 11, a diffusion plate 12, an optical sheet 13, and a liquid crystal driving IC (not shown) that are provided on the backlight unit 10 according to the first embodiment.

The liquid crystal display panel 11 includes a front-surface-side substrate 11b and a rear-surface-side substrate 11c that are opposite to each other with a liquid crystal layer 11a interposed therebetween, and a seal material 11d that is provided in a frame shape between the edges of the two substrates to adhere the two substrates. The front-surface-side substrate 11b is a transparent substrate, and a liquid crystal alignment control layer having, for example, an alignment film or a front-surface-side electrode made of a transparent conductive material is formed on one surface of a substrate body facing the liquid crystal layer. The rear-surface-side substrate 11c is also a transparent substrate, and a liquid crystal alignment control layer having, for example, an alignment film or a rear-surface-side electrode made of a transparent conductive material is formed on one surface of a substrate body facing the liquid crystal layer. In addition, a protruding portion is provided in one of the front-surface-side substrate 11b and the rear-surface-side substrate 11c so as to protrude from the edge of the other substrate, and a wiring pattern is formed on the protruding portion. The front-surface-side electrode of the front-surface-side substrate 11b and the rear-surface-side electrode of the rear-surface-side substrate 11c are electrically connected to the wiring pattern formed on the protruding portion. In addition, the liquid crystal driving IC that electrically drives the liquid crystal display panel 11 is mounted on the wiring pattern formed on the protruding portion.

The diffusion plate 12, the optical sheet 13, and the liquid crystal display panel 11 are provided on the backlight unit 10.

The liquid crystal display panel 11 is provided with an effective display area Ai, which is an area for displaying an image.

In a plan view of the liquid crystal display device 20, the edge of the effective display area Ai of the liquid crystal display panel 11 overlaps the reflecting surfaces 4a to 7a of the backlight unit 10. In addition, the effective display area Ai of the liquid crystal display panel 11 is provided in the radiation area Ar of the backlight unit 10.

The liquid crystal display panel 11 corresponds to a display panel according to the invention.

In the liquid crystal display device 20 according to this embodiment, the edge of the effective display area Ai of the liquid crystal display panel 11 overlaps the reflecting surfaces 4a to 7a of the backlight unit 10 in a plan view, and light that is emitted from the plurality of light sources 2 of the backlight unit 10 and then reflected from the reflecting surfaces 4a to 7a certainly irradiates toward the edge of the effective display area Ai. Therefore, it is possible to prevent the occurrence of display irregularities, such as brightness irregularity and color irregularity, in the effective display area Ai.

In this embodiment, in a plan view of the liquid crystal display device 20, the effective display area Ai of the liquid crystal display panel 11 is provided in the radiation area Ar of the backlight unit 10. Therefore, the amount of light emitted to the edge of the effective display area Ai is not reduced, and the amount of light is uniform in the entire effective display area Ai. As a result, it is possible to display an image with high quality and high brightness in the effective display area Ai.

Fourth Embodiment

Personal Computer

Next, a personal computer according to a fourth embodiment of the invention, which is an electronic apparatus using the liquid crystal display device 20 having the above-mentioned structure, will be described.

Figure 8:
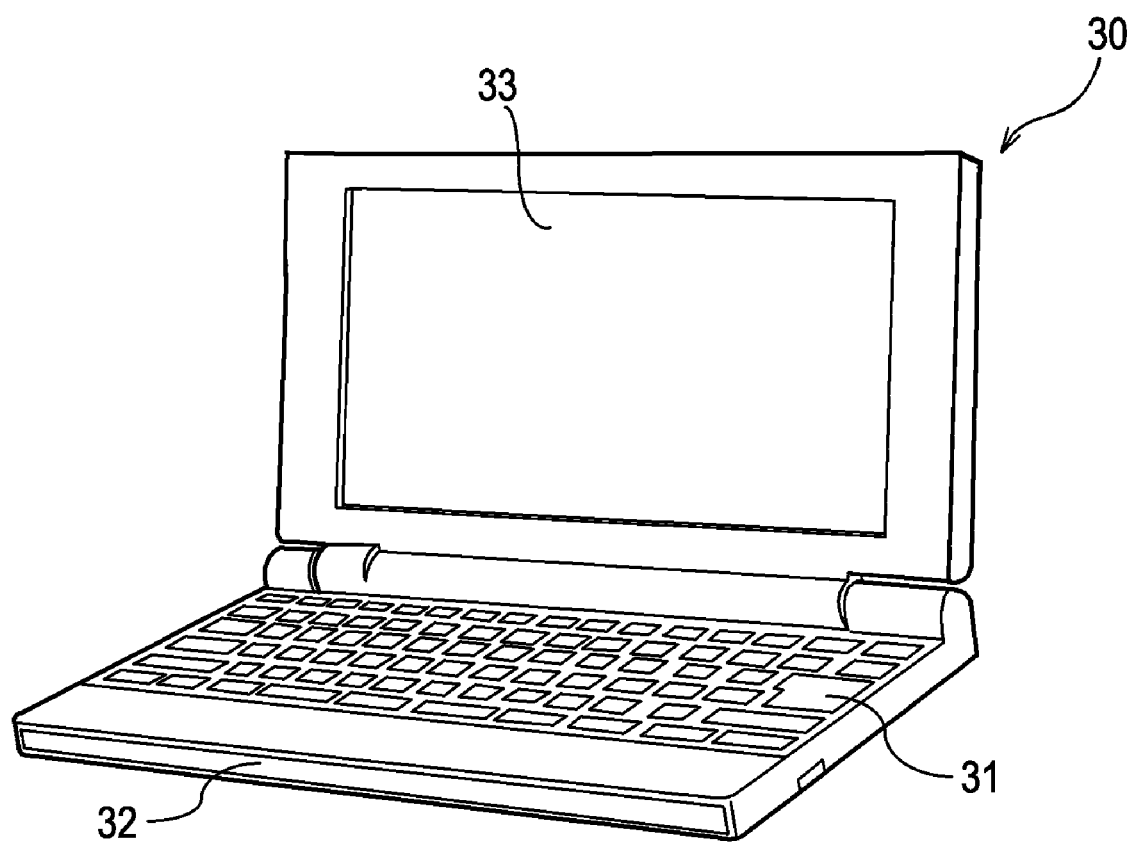
FIG. 8 is a perspective view illustrating an electronic apparatus according to a fourth embodiment of the invention.

A personal computer 30 shown in FIG. 8 includes a main body 32 having a keyboard 31 and a display unit 33 to which the liquid crystal display device 20 is applied.

According to the personal computer 30 of this embodiment, it is possible to provide the display unit 33 capable of displaying an image with high quality and high brightness.

The electronic apparatus according to the invention is not limited to the personal computer 30, but the invention can be applied to various electronic apparatuses. For example, the invention can be applied to a PDA (personal digital assistant), a small information electronic apparatus, such as a palmtop computer, a mobile phone, an electronic book, a digital still camera, a liquid crystal television, a view-finder-type or monitor-direct-view-type videotape recorder, a pager, an electronic organizer, an electronic calculator, a word processor, a workstation, a video phone, a POS terminal, and a printing apparatus.

What is claimed is:

1. A direct-type backlight unit comprising:
A plurality of light emitting diodes;
a planar arrangement surface on which the plurality of light emitting diodes are arranged; and
a plurality of reflecting surfaces that are formed at a plurality of edges of the planar arrangement surface and reflect light emitted from the plurality of light emitting diodes,
wherein light emitted from the light emitting diodes and light reflected from the plurality of reflecting surfaces irradiate toward an irradiation area surrounded by the plurality of reflecting surfaces,
the plurality of reflecting surfaces are inclined at an angle that is smaller than 90 degrees with respect to an extension surface of the planar arrangement surface that extends toward an outside of the reflecting surface,
the plurality of reflecting surfaces include reflecting surfaces having a large inclination angle and reflecting surfaces having a small inclination angle that is smaller than the large inclination angle, and
the light emitting diodes that are arranged along the reflecting surfaces having the large inclination angle are closer to an edge of the irradiation area than the other light emitting diodes that are arranged along the reflecting surfaces having the small inclination angle, in a plan view of the irradiation area.

2. A direct-type backlight unit comprising:
a planar arrangement surface on which a plurality of light emitting diodes are arranged; and a plurality of reflecting surfaces that are formed at a plurality of edges of the planar arrangement surface and reflect light emitted from the plurality of light emitting diodes, wherein light emitted from the light emitting diodes and light reflected from the plurality of reflecting surfaces irradiate toward an irradiation area surrounded by the plurality of reflecting surfaces, the plurality of reflecting surfaces are inclined at an angle that is smaller than 90 degrees with respect to an extension surface of the planar arrangement surface that extends toward the outside of the reflecting surface, the plurality of reflecting surfaces include reflecting surfaces having a large inclination angle and reflecting surfaces having a small inclination angle that is smaller than the large inclination angle, and the reflecting surfaces on which a large amount of light is incident from the light emitting diodes have the large inclination angle, and the reflecting surfaces on which a small amount of light is incident from the light emitting diodes have the small inclination angle.

3. The backlight unit according to claim 1, further comprising:

a case that includes a lower plate and a plurality of side walls which are vertically provided at an edge of the lower plate, wherein the planar arrangement surface having the plurality of light emitting diodes formed thereon is mounted on an inner surface of the lower plate, and the plurality of reflecting surfaces that reflect light emitted from the plurality of light emitting diodes are arranged on the inner surfaces of the plurality of side walls.

4. The backlight unit according to claim 1, further comprising:

a case that includes a lower plate and a plurality of side walls which are vertically provided at an edge of the lower plate, wherein the lower plate is the planar arrangement surface having the plurality of light emitting diodes formed thereon, and the plurality of reflecting surfaces that reflect light emitted from the plurality of light emitting diodes are arranged on the inner surfaces of the plurality of side walls.

5. The backlight unit according to claim 3, wherein a space is provided between the outside of the reflecting surface having the small inclination angle and the inside of the side wall.

6. The backlight unit according to claim 5, wherein electronic parts are provided in the space.

7. The backlight unit according to claim 1, wherein the plurality of light emitting diodes emit light such that a direction of a peak of an amount of light emitted is inclined at an angle of 50° to 80° with respect to a front direction of the plurality of light emitting diodes.

8. An electro-optical device comprising:

the backlight unit according to claim 1; and a display panel that is provided so as to overlap the irradiation area of the backlight unit, wherein the display panel includes an effective display area that displays an image, and an edge of the effective display area overlaps the plurality of reflecting surfaces of the backlight unit, in a plan view of the irradiation area.

9. The electro-optical device according to claim 8, wherein the effective display area is provided in the irradiation area.

10. An electronic apparatus comprising the electro-optical device according to claim 8.

11. A direct-type backlight unit comprising:

a plurality of light emitting diodes;

a planar arrangement surface on which the plurality of light emitting diodes are arranged;

a plurality of reflecting surfaces that are formed at a plurality of edges of the planar arrangement surface and reflect light emitted from the plurality of light emitting diodes, the plurality of reflecting surfaces including a first reflecting surface having a first inclination angle and a second reflecting surface having a second inclination angle, with respect to the planar arrangement surface the first inclination angle is larger than the second inclination angle; and an irradiation area surrounded by the plurality of reflecting surfaces, wherein at least one of the plurality of light emitting diodes arranged along the first reflecting surface is closer to the edge of the irradiation area than at least one of the plurality of light emitting diodes arranged along the second reflecting surface.

12. The backlight unit according to claim 11, wherein the plurality of reflecting surfaces are inclined at an angle that is larger than 90 degrees with respect to the planar arrangement surface.

13. The backlight unit according to claim 11, further comprising:

a case that includes a lower plate and a plurality of side walls which are vertically provided at an edge of the lower plate, wherein the planar arrangement surface having the plurality of light emitting diodes formed thereon is mounted on an inner surface of the lower plate, and the plurality of reflecting surfaces that reflect light emitted from the plurality of light emitting diodes are arranged on the inner surfaces of the plurality of side walls.

14. The backlight unit according to claim 11, further comprising:

a case that includes a lower plate and a plurality of side walls which are vertically provided at an edge of the lower plate, wherein the lower plate is the planar arrangement surface having the plurality of light emitting diodes formed thereon, and the plurality of reflecting surfaces that reflect light emitted from the plurality of light emitting diodes are arranged on the inner surfaces of the plurality of side walls.

15. The backlight unit according to claim 13, wherein a space is provided between the outside of the second reflecting surface and the inside of the side wall.

16. The backlight unit according to claim 15, wherein electronic parts are provided in the space.

17. The backlight unit according to claim 11,
wherein the plurality of light emitting diodes emit light such that a direction of a peak of an amount of light emitted is inclined at an angle of 50° to 80° with respect to a front direction of the plurality of light emitting diodes.

18. An electro-optical device comprising:
the backlight unit according to claim 11; and
a display panel that is provided so as to overlap the irradiation area of the backlight unit,
wherein the display panel includes an effective display area that displays an image, and
an edge of the effective display area overlaps the plurality of reflecting surfaces of the backlight unit as viewed in plan.

19. The electro-optical device according to claim 18,
wherein the effective display area is provided in the irradiation area.

20. An electronic apparatus comprising the electro-optical device according to claim 18.

* * * * *